United States Patent [19]

Ziu

[11] Patent Number: 5,085,471
[45] Date of Patent: Feb. 4, 1992

[54] DOUBLE CONTAINMENT PIPE JOINT ASSEMBLY

[75] Inventor: Christopher G. Ziu, Somerville, Mass.

[73] Assignee: Double Containment Systems, Monroe, Conn.

[21] Appl. No.: 682,193

[22] Filed: Apr. 4, 1991

[51] Int. Cl.⁵ .............................................. F16L 39/00
[52] U.S. Cl. ................................... 285/133.1; 285/138
[58] Field of Search ................... 285/133.1, 138, 47, 285/905

[56] References Cited

U.S. PATENT DOCUMENTS

| | | | |
|---|---|---|---|
| 1,140,633 | 5/1915 | Trugano | 285/138 |
| 3,275,345 | 9/1966 | Waldron et al. | 285/138 |
| 3,693,665 | 9/1972 | Veerling | 285/47 |
| 3,794,358 | 2/1974 | Allen et al. | 285/138 |
| 3,865,145 | 2/1975 | McKay et al. | 285/47 |
| 4,108,476 | 8/1978 | Krupp | 285/138 |
| 4,111,466 | 9/1978 | Derfgibus | 285/133.1 |
| 4,121,858 | 10/1978 | Schulz | 285/133.1 |
| 4,423,778 | 1/1984 | Goldsmith | 285/138 |
| 4,484,771 | 11/1984 | Schulz | 285/138 |
| 4,573,527 | 3/1986 | McDonough | 285/133.1 |

FOREIGN PATENT DOCUMENTS

| | | | |
|---|---|---|---|
| 1525925 | 1/1970 | Fed. Rep. of Germany | 285/138 |
| 2621806 | 12/1977 | Fed. Rep. of Germany | 285/138 |
| 837112 | 6/1960 | United Kingdom | 285/138 |

Primary Examiner—Eric K. Nicholson
Attorney, Agent, or Firm—Kramer, Brufsky & Cifelli

[57] ABSTRACT

A double containment pipe joint assembly is provided with an inner pipe and an outer or containment pipe secured to the joint assembly in concentric relation. The pipe joint assembly includes a first and second fitting coupled together to present end surfaces which can be secured to a length of a primary (inner) and containment (outer) pipe at intervals along the pipeline wherein sections of the pipeline can be removed and repaired without the necessity of removing the whole pipeline, while anchoring the pipes together at spaced locations along the pipeline. The arrangement further allows the pipes to be formed from different materials compatible with the pipe fittings and precludes the necessity of providing flanges on the inner and containment pipes so they can be secured in concentric relationship, lessening the chance for failure. One of the inner and outer fittings has two sections (either separate or cast in one piece) which are secured in mirror-image relation to a ring on the other section. One of the pipe fittings has a tubular section forming a bore therethrough for the passage of fluid from the primary or inner pipe. The other fitting either has tabs or a ring for receiving tabs coupling the fittings together to present end surfaces for securement to the inner and containment (outer) pipes.

16 Claims, 6 Drawing Sheets

DOUBLE CONTAINMENT PIPE JOINT ASSEMBLY

BACKGROUND OF THE INVENTION

1. Field of the Invention

The present invention relates to double containment pipe fittings and their assembly.

2. Description of the Prior Art

The general concept of providing a double or dual containment pipe system wherein an inner carrier pipe is concentrically located within an outer containment pipe to deliver dangerous or hazardous fluids is well known and an accepted commercial practice. Historical applications for such systems have been found in the nuclear, gas petroleum production and refining and chemical processing industries. The inner pipe is used to transport the hazardous or toxic fluid while the outer pipe is present to confine any leaks. Thus, it is also known to provide the annulus between the concentric pipes with various types of detectors and/or drainage apparatus to handle leakage. Examples of double containment pipe assemblies are shown in U.S. Pat. Nos. 4,786,088; 4,886,305 and 4,930,544.

With the advent of stricter governmental regulation concerning the piping of petroleum products and hazardous chemicals, the anticipated increased use of various types of pipes in double containment applications is a certainty. As such, the structural design of these fittings and method of installing and repair of double containment pipes containing such fittings is necessary.

The present invention provides novel double containment fittings for forming a double containment pipe joint. The products that have been developed to date have not completely addressed some of the unique problems that arise when a pipe is placed within another pipe.

One such problem is the ease of maintaining, modifying or repairing such systems. To date, all above ground pressure systems have been installed without the ability to assemble or disassemble the piping or components in modular sections. Therefore, if a repair is to be made, the original system manufacturer/contractor must be called in to facilitate the repair. In many designs, a repair of a certain section would not be feasible or even possible due to the location of the system with respect to adjacent equipment or building parts. What would be very helpful to most facility owners is the ability to have a modular system that is capable of being readily disassembled. A system capable of being readily disassembled would give the facility engineer the ability to have the section requiring modification or repair sent to a shop type environment readily suitable and equipped to facilitate the change or repair.

Another problem is the ability to provide a means of internally anchoring the inner piping of a double containment piping system. In ordinary single wall, non-double containment piping, it is often required to provide a means of anchoring the piping at a fixed point. There are several reasons why this is often necessary. One such reason is to control or limit vibration that might occur during the operation of the piping system. Another reason is to control and direct thermal expansion and contraction of the piping system. By forcing thermal expansion/contraction away from a point of anchorage, several ordinary layout means can then be used to "compensate" or "alleviate" the build-up of thermal stresses. This is ordinarily done by adding some means of flexibility and added degrees of movement into the piping system between points of anchorage. Also, anchors can sometimes be placed in sequence without flexible means placed between them. Thermal expansion can then be accommodated by allowing a controlled amount of displacement strains to occur. This is possible if the total of predicted stresses that result do not exceed the allowable for the material, taking into account any cyclic effects.

Thus, the use of anchoring devices is a key element to a successful pressure piping design in both metal and nonmetal systems. In double containment piping, sometimes the inner piping is subjected to a greater amount of thermal expansion or contraction than the outer piping. Sometimes, however, it is the outer piping that can experience the greater overall change in dimension. What would be highly beneficial would be to have a component which would allow both pipes to be anchored to each other, yet still maintain an area of "zone" of containment around the entire inner pipe. Such a component would also be highly useful if it were to be able to be added into a system having any possible combination of materials (e.g., metal inside of plastic), as well.

Another such problem has to do with the ability of a system to withstand the effects of inner and outer piping and components that are subjected to different amounts of thermal expansion and contraction. It is the norm, rather than the exception, that the inner and outer pipes of a pressure rated double containment piping system are subjected to different amounts of thermal expansion. This situation may arise in several different ways. The most common way involves the situation whereby a hot fluid is transported through the inner pipe. Under this circumstance, the external environment (external that is to the outside diameter of the secondary containment piping) is normally at a lower temperature than the hot fluid. Since there is either an insulating dead air space between the two pipes, or other insulating material, the inner piping temperature becomes close to that of the fluid, while the outside piping remains closer to that of the external ambient environment. Therefore, the materials normally grow to different lengths due to their being at different temperatures. When this does occur, there are thermal strains that are imposed on interconnecting parts and on parts such as internal anchors and termination fittings that create a contact point between the inner and outer piping. The most obvious place where there is a problem potential is at the interconnecting points. However, any place where loads can be transmitted back and forth between the two pipe systems can result in a problem. With the exception of the development described in this application, all restraint couplings (internal anchors and termination fittings) designed for this situation are constructed of a singular material, with such a design that the residual stresses and subsequent strain on the materials can lead to a failure of such parts. These existing parts then become the point in the overall system at which failure is most likely to occur. This is compounded by the fact that the components are truly single containment at that point, without having a containment area to prevent the hazardous fluids from reaching the environment. Therefore, exactly where it would be the least desirable location for failure to occur is the most likely place for failure to occur. Additionally, a double containment piping system that is constructed of an interconnecting part as described above, actually increases the chance that failure to the external environment can occur as compared to a singular containment piping system designed with proper treatment of the thermal expansion of its components.

Another problem with existing systems has to do with the ability to combine different inner and outer pipe materials in an efficient manner. Different materials can mean materials that are of a different class, (such as metallic-thermoplastic, metallic-reinforced thermosetting plastic, or thermoplastic-reinforced thermosetting plastic), or materials that are within the same class but constitute a different material, (such as within the thermoplastic family, combining a fluoropolymer within a polyolefin, or a polyolefin within another polyolefin). The reason that it is desirable to combine materials typically has to do with economics. It is desirable in many situations to combine an expensive material that is capable of handling a chemical on a full time basis within a less expensive material capable of withstanding the corrosive effects of a chemical for a limited period of time. Another major economic reason has to do with the use of a material for the outside piping capable of withstanding the corrosive effects of atmospheric conditions, thus eliminating the need for expensive coatings, cathodic protection, etc. A typical example of this would be in combining a metallic material within a nonmetallic outside material for the reasons just described. Yet a third reason has to do with structural concerns, such as where a non-metallic material is housed within a metallic outer jacket, for purposes of protecting a pipe that is buried to shallow depths from possible large "live loads" due to vehicular traffic on the ground surface.

SUMMARY OF THE INVENTION

The novel pipe joint fittings disclosed in this application hold several significant benefits as compared to the prior art:

The pipe fittings allow a double containment system to be constructed in modular sections without flanged ends on the primary and containment pipes. When the fitting is to be used as a termination fitting, a flange may be provided on one side of the coupling, attached to the "primary" pipe portion. This may be done to allow the double containment piping system to be mated to a single wall flange, as would normally be the case when the system is connected to a pump, tank, vessel, heat exchanger or other equipment at its initiation point. However, the fitting does not need to be flanged. It may be directly welded if the associated equipment has the appropriate connection.

The interconnecting primary and secondary fittings that have been developed are designed in a manner such that an internal portion will not be under high stress levels and in no case will be at a level that will result in stress levels above that allowable for the material under all possible concurrent loadings. Also, the external portion is designed in such a manner that it is relatively stress free. Thus, the new part described is designed in such a manner that it is much less likely to fail as compared to the existing solid type of interconnecting part that is presently being used. However, even if failure were to occur, the interconnecting fittings have an additional feature that the fluid can be contained within the secondary containment system, whereas the prior art system is formed from a singular member and has no such ability.

Additionally, the interconnecting fittings can be constructed with inner and outer portions being of the same material or any combination of materials. In other words, if the same material is used for the inner and outer materials, such as polypropylene within polypropylene, the interconnecting part can be designed with inner and outer parts being constructed of the same. However, if the inner piping material is a metal and the outside material is a different metal material or even a plastic such as reinforced epoxy, the part can be made with inner and outer portions that match the respective materials of the adjacent pipes. In the prior art, e.g., as shown in U.S. Pat. Nos. 4,786,088 and 4,930,544, the presently used part is constructed of a solid material only allowing for connection to a dissimilar secondary containment material only through the use of special flanges being attached to the outer portion of the part. This adds expense and creates difficulty in installing the interconnecting part into the rest of the system. Thus, the new fitting is not only less likely to fail, and has a containment feature in the event of failure, but can be constructed of any combination of materials, and results in the least expensive arrangement in any given situation.

The mechanical joint coupling of the invention consists of an inner solid fitting that contains an integral lap joint flange, mechanically coupled with an outer assembly fitting that is fused, cast or molded into place to result in a double coupling, capable of having both inner and outer pipes attached to it, and acting as a point of rigid and fixed interconnection between inner and outer pipe systems. If desired, the inner and outer fitting can be reversed. The coupling serves as an internal anchor to anchor the primary and secondary containment pipes to each other, without interrupting the double containment aspect of the system at the anchoring point. It can also serve as a means of initiating or terminating the double containment piping system.

To reiterate, there are four major advantages of this coupling over previously existing parts. (1) The coupling can be manufactured from dissimilar inner and outer materials, thus allowing it to be readily incorporated into pipe systems with dissimilar inner and outer materials. (2) The coupling eliminates the need for flange connections for the secondary containment when dissimilar materials are used, thus making the overall system less expensive versus presently used methods. (3) The assembly of the inner and outer portions of the coupling allows for true separation of the parts, thus allowing containment of the fluids should there be a failure of the inner (primary) portion. (4) The coupling is designed in such a manner that there is less likelihood of its failure as compared to conventional parts, due to an even distribution of stresses when thermal expansion is imposed, and due to strategically placed added reinforcement.

BRIEF DESCRIPTION OF THE DRAWINGS

Further objects and advantages of the invention will become more apparent from the following description and claims, and from the accompanying drawings, wherein:

DETAILED DESCRIPTION OF THE PREFERRED EMBODIMENT

Figure 1:
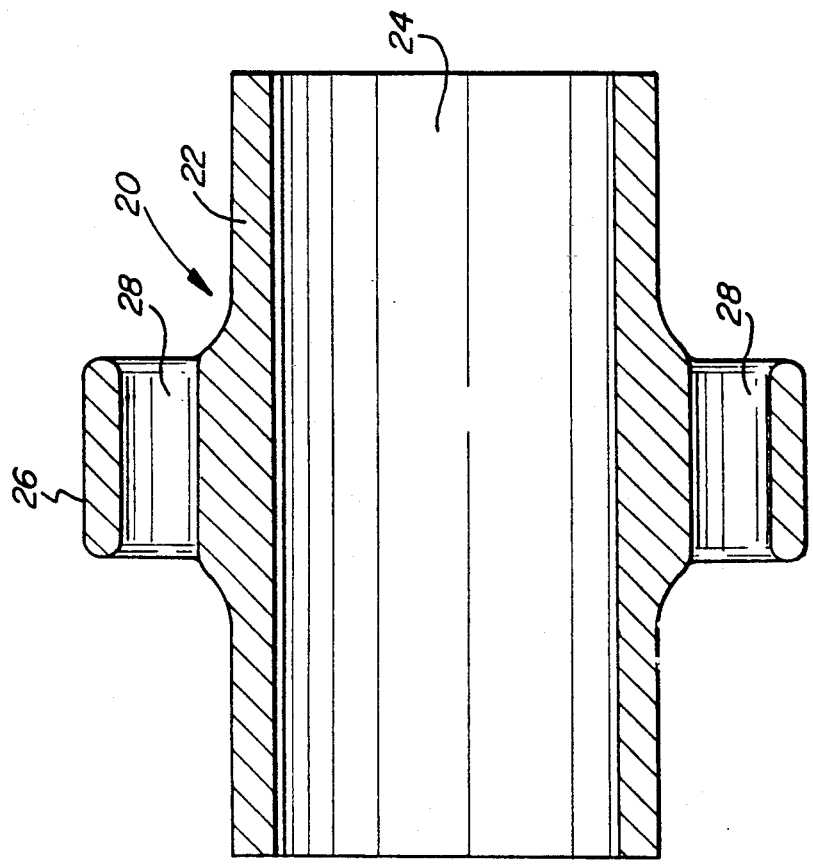
FIG. 1 is a longitudinal cross-sectional view of the inner pipe coupling member or fitting of the double containment pipe joint assembly of the present invention.
Figure 2:
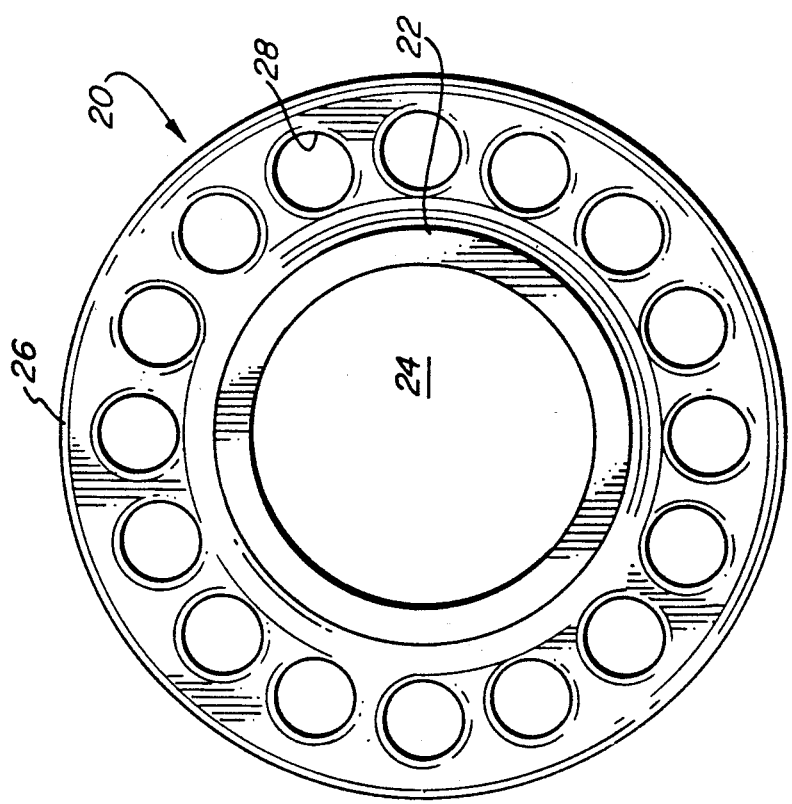
FIG. 2 is an end view in elevation of the pipe joint member illustrated in FIG. 1 as seen from the left-hand side of FIG. 1.
Figure 3:
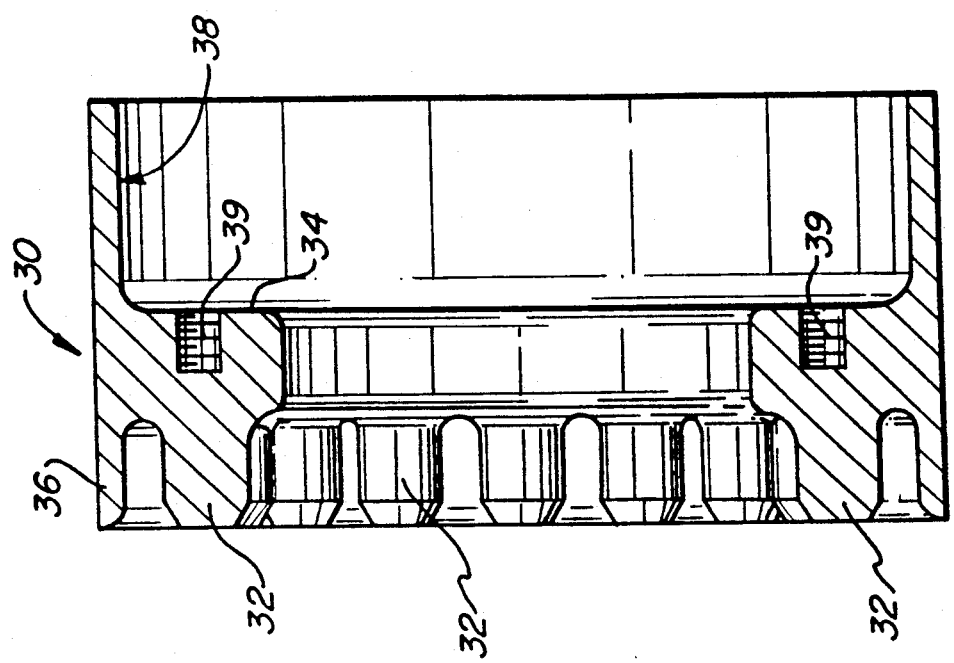
FIG. 3 is a longitudinal cross-sectional view through the outer or containment pipe joint member or fitting of the double containment pipe joint assembly of the present invention.
Figure 4:
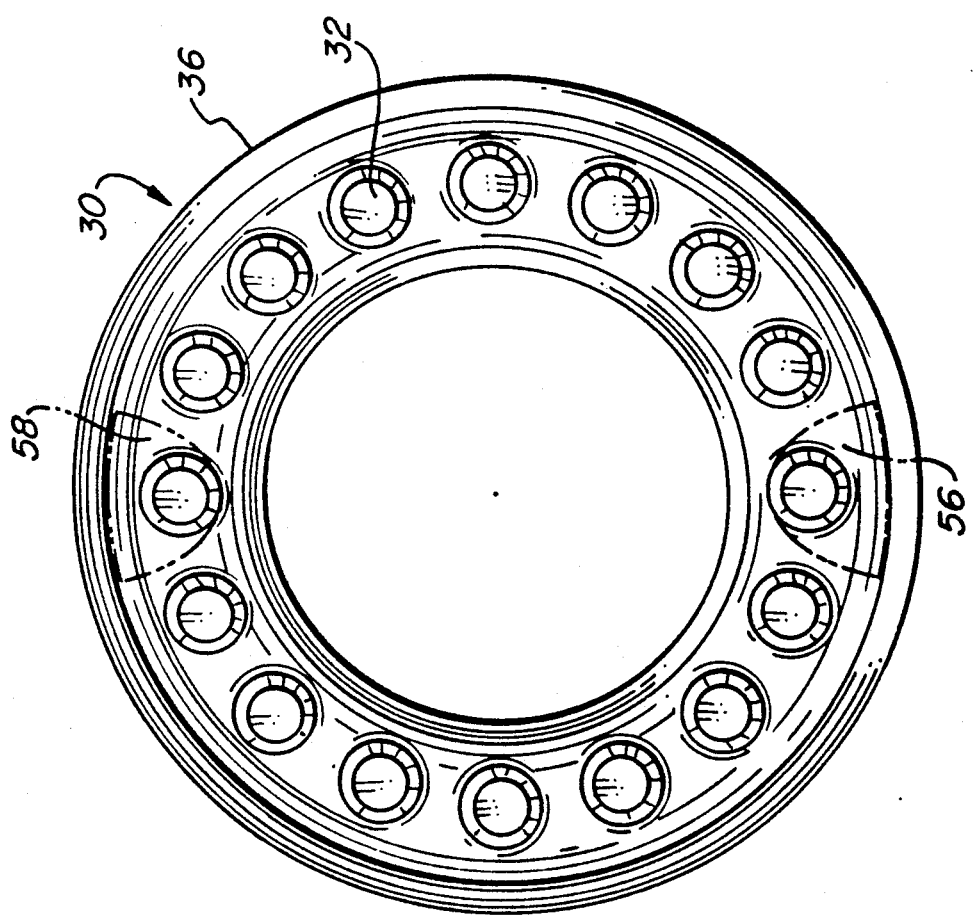
FIG. 4 is an end view in elevation of the pipe joint member of FIG. 3 as seen from the left-hand end of FIG. 3.
Figure 5:
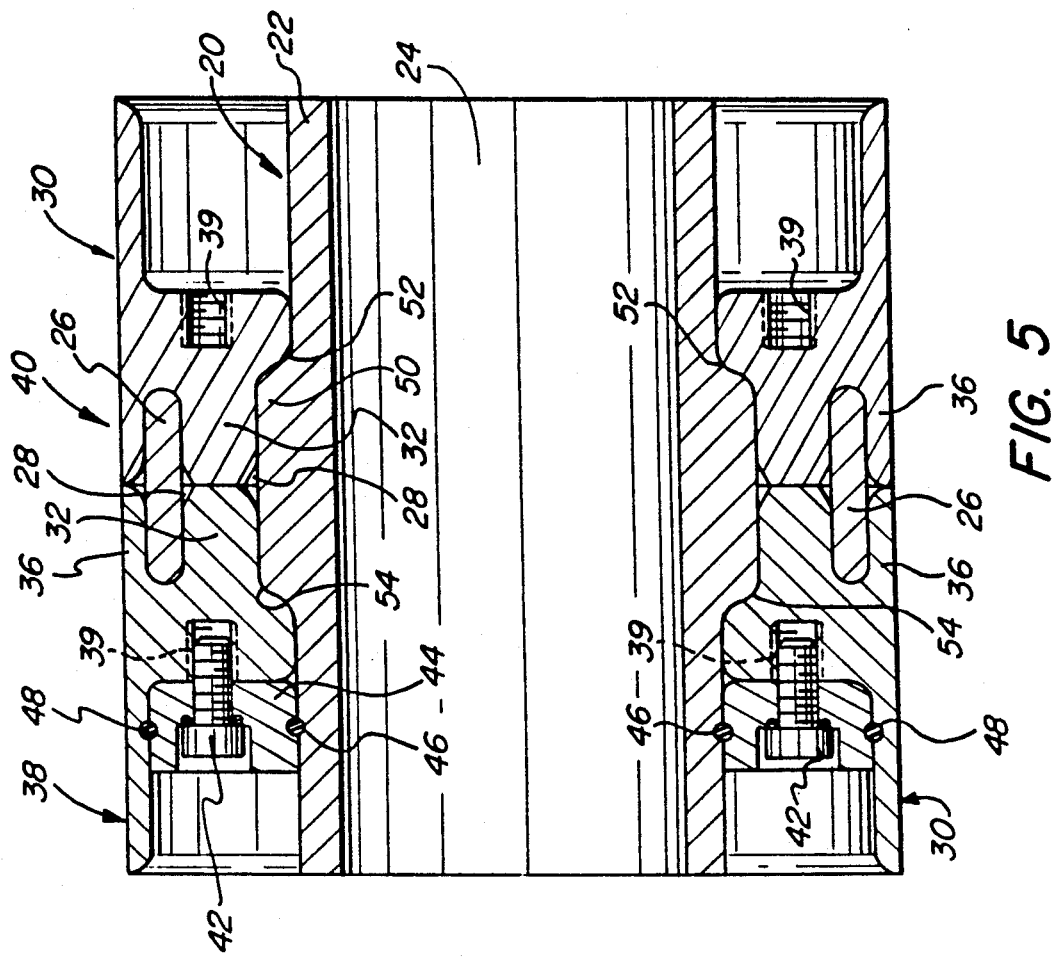
FIG. 5 is a longitudinal cross-sectional view of the double containment pipe joint assembly of the present invention formed with the pipe joint members or fittings of FIG. 1 and FIG. 3.
Figure 6:
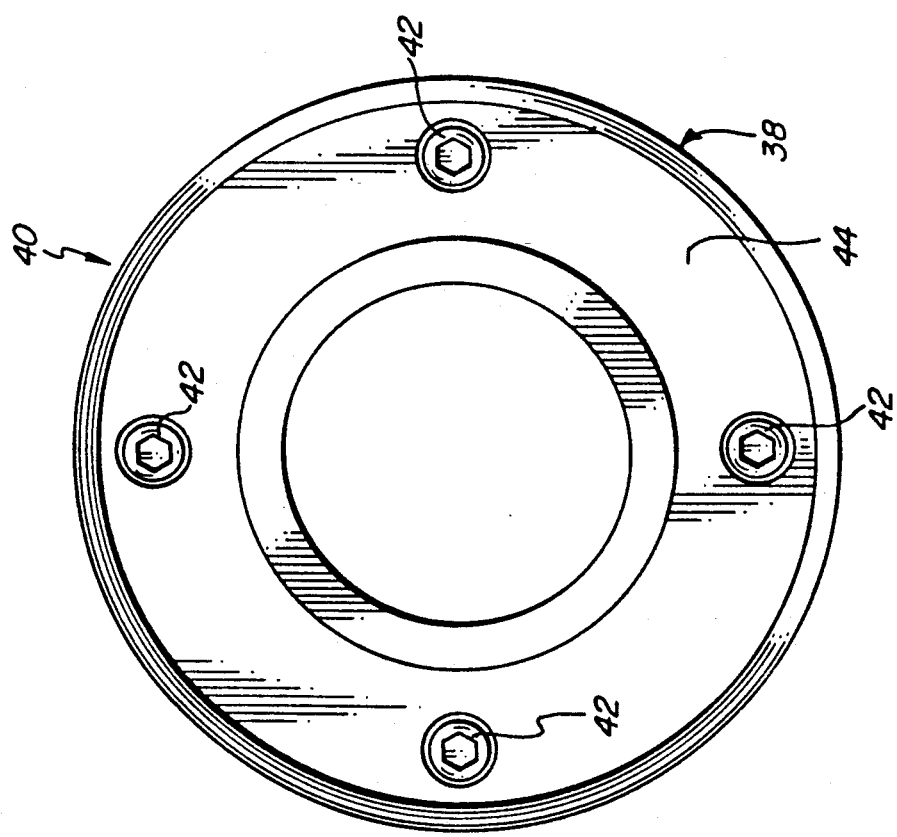
FIG. 6 is an end view in elevation of the double containment pipe joint assembly illustrated in FIG. 5 as seen from the left-hand side of FIG. 5.

Referring now to the drawings in detail, wherein like numerals indicate like elements throughout the several views, FIGS. 1 and 2 illustrate an inner pipe fitting 20 adapted to be coupled with an outer or containment pipe fitting 30 (FIGS. 3 and 4) to form a double containment pipe joint or internal anchor assembly 40 (FIGS. 5 and 6). Each of the fittings 20,30 can be constructed of any type of metal (e.g., cast, cast with secondary machining, or machined from a solid part), reinforced thermosetting plastic material (e.g., cast, or thermoplastic material; e.g., injection molded or machined from a solid part).

Generally, the inner pipe fitting 20 includes an elongated tubular body portion 22 having a cross-sectional area conforming to the cross-sectional area of the primary pipe of the double containment system, or in some cases having a cross-sectional area greater than the primary pipe, depending on pressure calculations. As shown in FIGS. 1 and 2, this cross-sectional shape is generally circular.

The main fluid contained within the system will flow through the bore 24 of fitting 20. The central portion of the tubular body portion 22 of fitting 20 is provided with a concentric ring 26 circumscribing its mid-portion. Ring 26 is provided with a plurality of spaced circular openings 28 therethrough adjacent its circumference. Openings 28 are of such a diameter in cross-section so as to receive a matching tab 32 (as will be explained more fully hereinafter) extending from surface 34 of the outer pipe or containment fitting 30. The number of openings or holes 28 vary, but matches the number of tabs 32 on fitting 30. The number of openings or holes 28 may vary, as well as the number of tabs 32 received within the holes 28. The number of holes and tabs may be determined by the size combination of the inner and outer pipes used with the joint coupling 40 and the corresponding materials of construction. The same is true of the diameter of the holes 28 and the matching tabs 32. In other words, the number of holes and matching tabs are dependent on the size, length and diameter as well as the material of the inner and outer pipe construction to be joined by the coupling 40 which in turn is directly proportional to the desired strength of the coupling for holding the double containment pipes, and due to concurrent effects such as pressure, thermal stresses, etc.

The outer containment fitting 30 also includes an integral flange 36 about its outer circumstance which is spaced from the tabs 32. The opposite side of fitting 30 includes a ring 38 terminating in outer circumference flange 36. A series of threaded bores 39 are provided on surface 34, for example, at the 12 o'clock, 3 o'clock, 6 o'clock and 9 o'clock positions about the circumference of surface 34 for a purpose which will be described hereinafter.

With specific reference to FIGS. 5 and 6, the double containment pipe internal anchor assembly 40 is formed by inserting the tabs 32 into holes 28 on ring portion 26 of inner pipe fitting 20 from both sides of ring 26 until the tabs on each of the two fittings 30 abut as illustrated in FIG. 5. If desired, the abutting circumferences 36 of fitting 30 may be welded together and the tab end faces suitably joined in mirror-image relation. If one end of the pipe joint coupling is to serve as a termination point for the double containment pipe assembly, a collar 44 may be inserted in one end of the pipe internal anchor assembly 40 between the outer circumference of tubular body portion 22 of the inner pipe fitting 20 and the inner circumference of ring 38 on outer pipe fitting 30. O-ring seals 46 and 48 are disposed between the collar 44 and tubular portion of the inner pipe fitting 20 and ring 38 and the collar 44, respectively, to preclude leakage of fluid through the termination point of the pipe internal anchor assembly. Threaded bolts 42 are inserted at the 12 o'clock, 3 o'clock, 6 o'clock and 9 o'clock positions of the circular end face of the collar 44 to fix the collar to the outer pipe joint fitting 30 in the threaded bores 39.

The tubular portion 22 of the inner pipe fitting may be plugged or otherwise closed adjacent the ring 38. If the pipe joint assembly 40 is used intermediate the ends of the double containment pipe assembly, then collar 44 can be eliminated. In either event, a length of inner pipe may be suitably attached, such as by welding, adhesive binding or solvent cementing (dependent on the material of the inner pipe) to one or both ends of tubular body member 22, while similarly, a length of containment or outer pipe may be adhered to one or both of the end surfaces of ring 38 of each outer pipe fitting 30 to complete the double containment assembly. The use of the coupling 40 enables the inner and outer pipes of the pipe assembly to be made or fabricated from different materials, dependent upon the material of the inner and outer fitting. For example, the inner pipe can be welded to a metal tubular body portion 22 while epoxy may be used to adhere the outer containment pipe to the end of ring 38 of outer pipe fitting 30. Furthermore, the flanges 36 of the outer fitting 30 may be welded together.

In the event of a leak from the inner pipe connected to tubular body portion 22 of fitting 20, the leak will be contained within a section of the outer pipe between spaced fittings 30. This section can be repaired simply by removing adjacent outer couplings 30 supporting the containment pipe and repairing the leak in the inner pipe between that section of the containment pipe. By use of flanged, nested coupling members, the inner and outer pipes of the double containment pipe assembly system does not require flanges or other connectors. The inner and outer pipes can merely be attached to tubular member 22 and ring 38, respectively, of the inner and outer pipe fittings 20 and 23, respectively.

The central portion 50 of tubular body portion 22 of inner pipe fitting 20 may be increased in diameter and thus strengthened to absorb thermal expansion, and to withstand internal pressure and concurrent effects, of either the inner or outer pipes of the double containment pipe construction. Further, the central portion 50 can be formed with fillets 52 and 54 to smooth out stresses and aid in locking the mating parts in the pipe joint assembly 40.

As illustrated in FIG. 4, the outer or containment pipe fitting 30 can be provided with cut-outs 56,58 at the 6 o'clock and 12 o'clock positions of tabs 32 in lieu of the tabs at those positions. If necessary, adjacent portions of the inner pipe fitting 20 can have similar, mating cut-outs (not shown). This enables continuous fluid flow or a leak detection cable to be inserted through the 6 o'clock position in the annulus and continuous venting of air through the 12 o'clock position of the annulus, if the system is designed for such eventualities.

Figure 7:
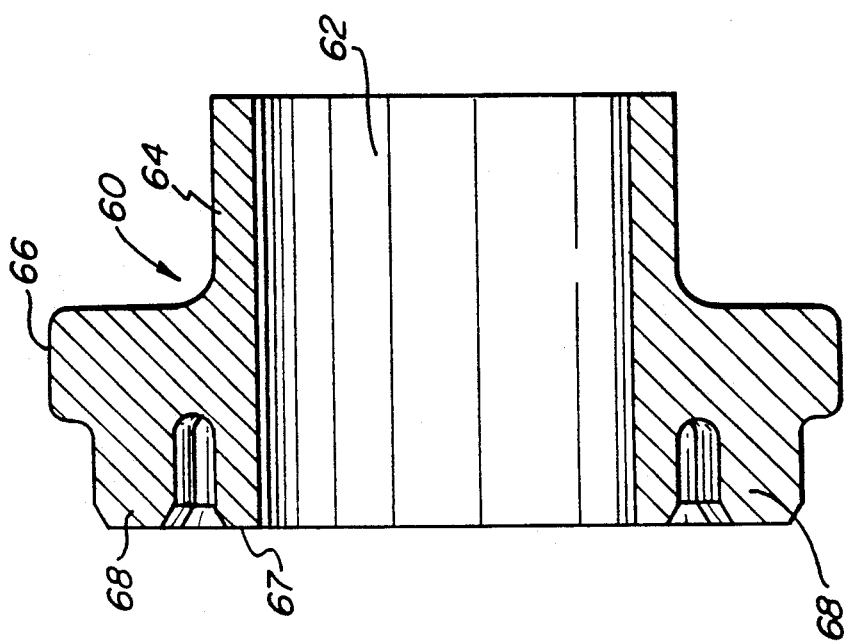
FIG. 7 is a longitudinal cross-sectional view through a second form of the inner pipe assembly member or fitting forming a portion of the double containment pipe joint assembly of the present invention.
Figure 8:
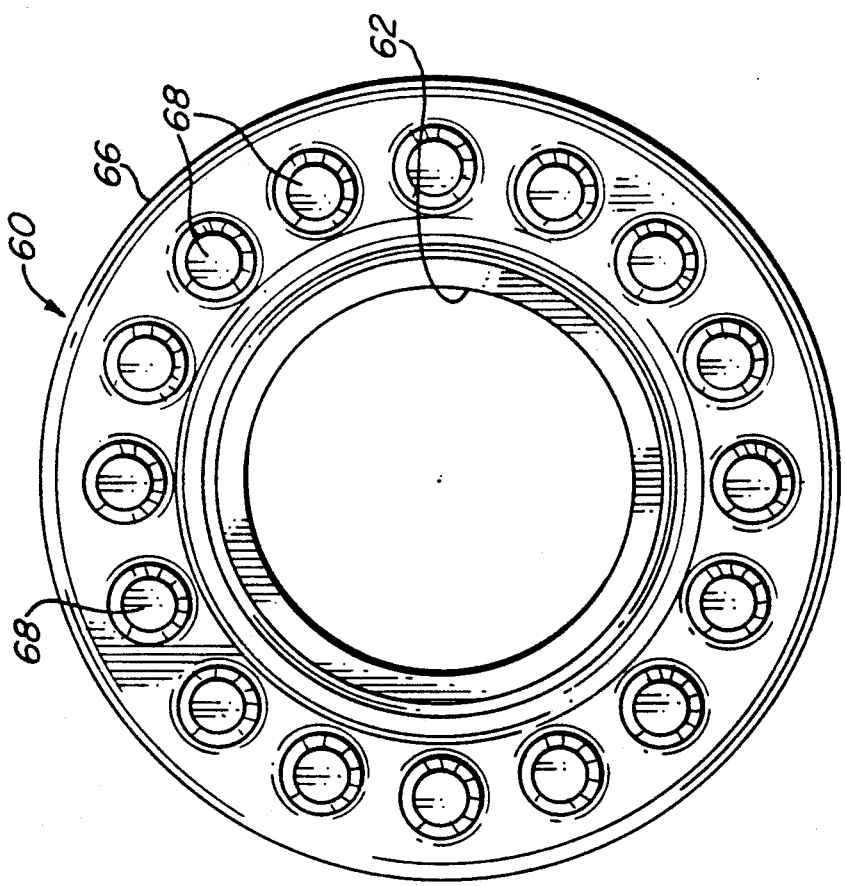
FIG. 8 is a side view in elevation of the inner pipe joint member or fitting of FIG. 7 as seen from the left-hand side of FIG. 7.
Figure 9:
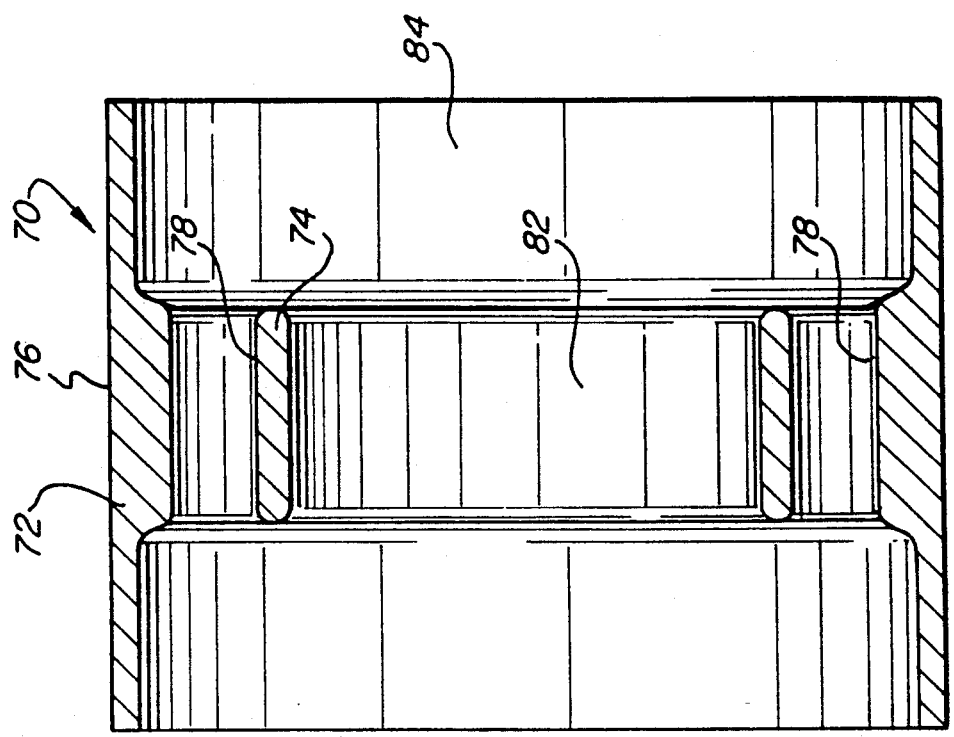
FIG. 9 is a longitudinal cross-sectional view through modified form of the containment or outer pipe joint member or fitting adapted to be coupled to the inner pipe fitting of FIG. 7.
Figure 10:
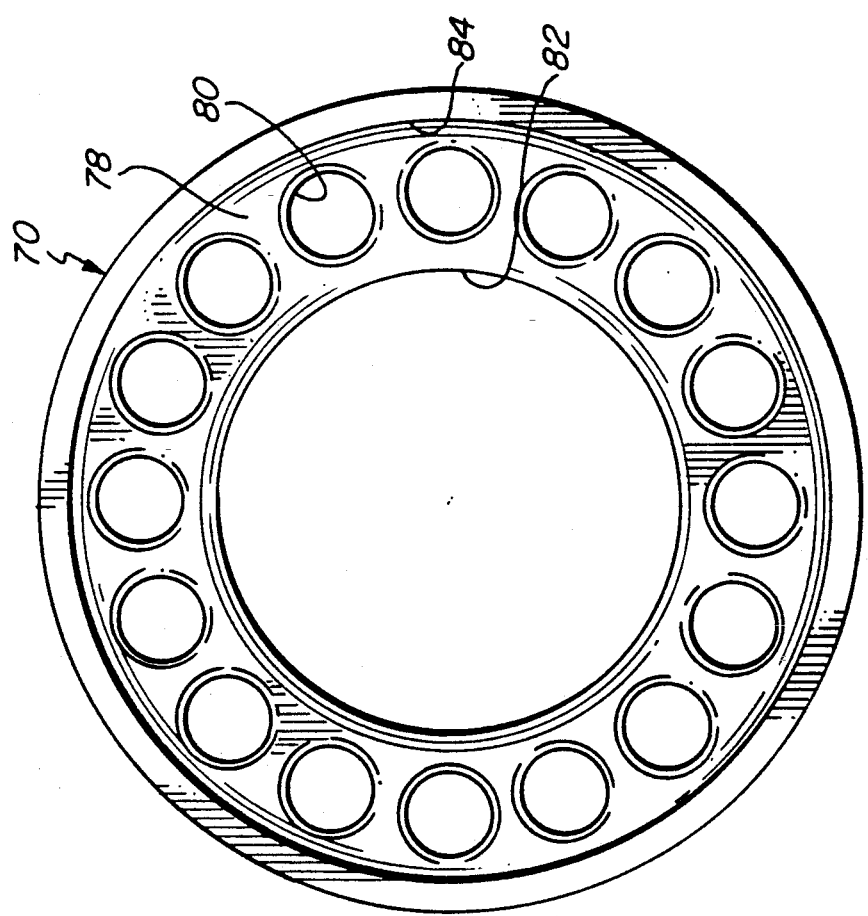
FIG. 10 is a side view in elevation of the containment or outer pipe joint member or fitting of FIG. 9 as seen from the left-hand side of FIG. 9.
Figure 11:
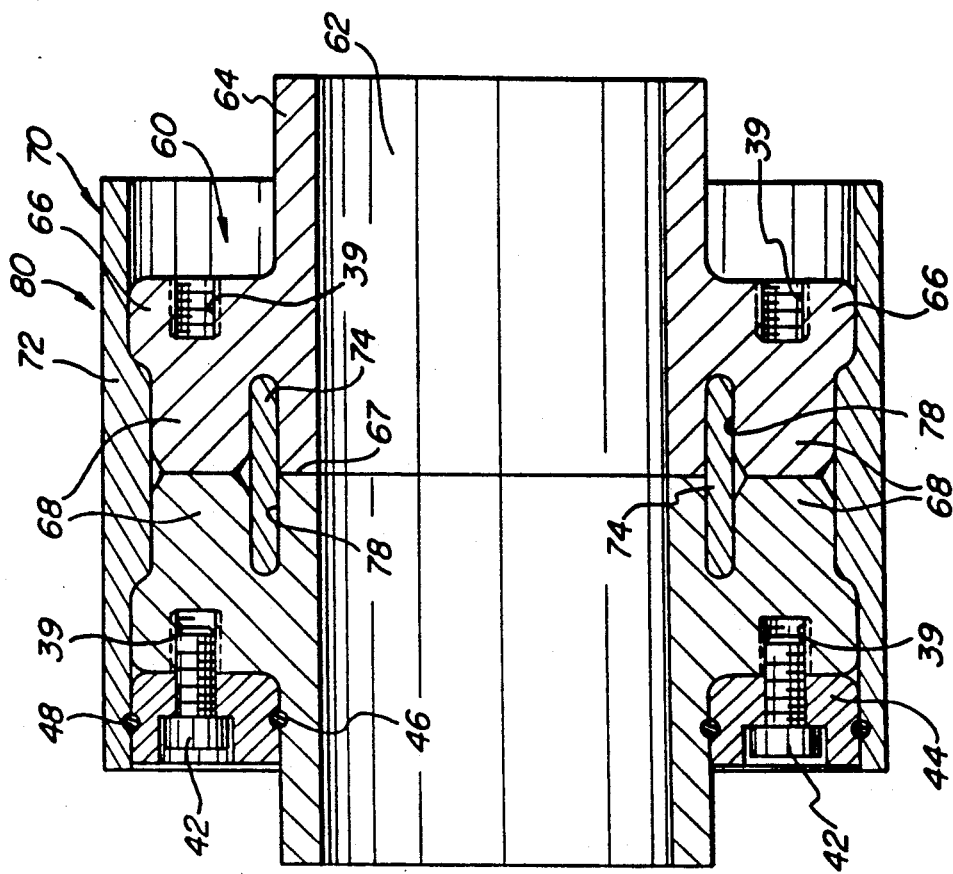
FIG. 11 is a longitudinal cross-sectional view of the pipe joint member or fittings of FIGS. 7 and 9 coupled together to form a double containment pipe joint assembly coupling of the present invention.
Figure 12:
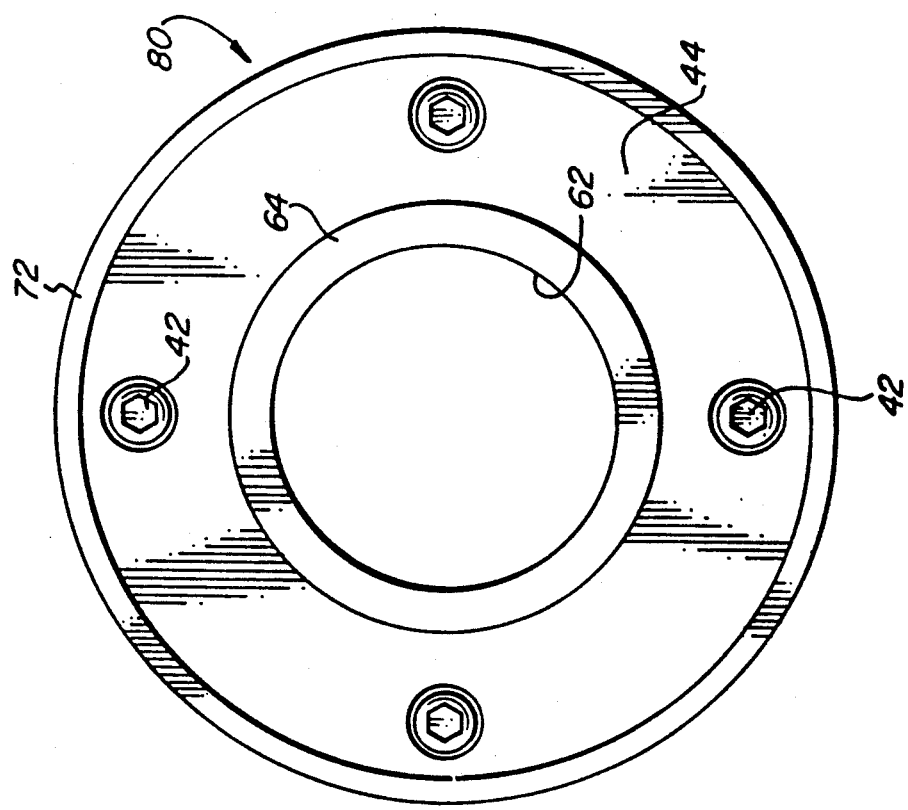
FIG. 12 is a side view in elevation of the pipe joint coupling of FIG. 11 as seen from the left-hand side of FIG. 11.

A second embodiment of a pipe joint assembly formed in accordance with the concepts of the present invention is illustrated in FIGS. 11 and 12 by the numeral 80. The pipe internal anchor assembly 80 is formed from an outer or containment pipe fitting 70 (FIGS. 9 and 10) adapted to receive two inner pipe fittings 60 (FIGS. 7 and 8) in mirror-image relationship seated within the outer pipe fitting 70. In the embodiment of the invention illustrated in FIGS. 1-6, inclusive, two outer pipe fittings 30 are seated on the inner pipe fitting 20 in mirror-image relation. This is reversed in the embodiment illustrated in FIGS. 7-12.

The inner and outer pipe fittings 60,70, respectively, may be formed from different materials and incorporate the same characteristics as the fittings 20,30 of pipe joint assembly 40. Inner pipe fitting 60, however, includes a central bore 62 through which fluid can flow provided in a tubular member 64 having a ring portion 66 at one end thereof provided with laterally extending tabs 68.

The outer or containment pipe fitting 70 of pipe joint assembly 80 includes a collar 72 provided with a central ring 74 spaced from the circumference 76 of collar 74 by an annulus 78 provided with circular openings 80. Ring 74 has a central bore 82 contiguous with the interior bore 84 of collar 72.

The pipe joint assembly 80 is formed as shown in FIGS. 11 and 12 by inserting tabs 68 on the inner pipe fitting 60 into openings 78 from both sides of collar 70 in mirror-image relation. The tabs 68 may be joined to each other along abutting surfaces while annuli 66 of each fitting 60 may be welded to the interior of collar 72. The collar 72 has a strengthened or enlarged central portion to absorb stress due to desired elongation of the inner or outer pipe and associated stresses on the pipes, and due to internal pressures and other concurrent effects, in a manner similar to enlarged central portion 50 of fitting 20.

If the outer pipe or containment pipe is to be terminated by assembly 80, the collar 44 with O-rings 46 and 48 may be secured to one of the inner fittings 60 between collar 72 and the outer surface of tubular portion 64 of the inner fitting 60 in the same manner as collar 44 is secured in FIG. 5 in pipe joint assembly 40. An inner pipe may then be welded or otherwise secured to the end of tubular portion 64 adjacent flow-through opening or bore 62, while an outer containment pipe can be secured to the end of collar 70.

While two fittings 30 and 60 have been illustrated as constituting the outer and inner fittings of the pipe joint assemblies 40 and 80, respectively, in certain applications, the fittings may be cast in situ as a single member or be formed in one piece as a single member.

What is claimed as new is:

1. A double containment pipe joint assembly comprising:
   a first pipe fitting having a tubular portion and a bore therethrough extending along a longitudinal axis of said tubular portion and at least one end surface adapted to be joined to a first pipe;
   a second fitting having an end face adapted to be secured to a second or containment pipe concentrically mounted about the tubular portion of said first fitting;
   one of said first and second fittings having identical portions mounted in mirror-image relation about an axis perpendicular to said longitudinal axis of said tubular portion through the other of said fittings on a ring provided on the other of said first or second fittings,
   said one of said first and second fittings being mounted in mirror-image relation by a plurality of tabs provided about the circumference of said one of said first and second fittings received within correspondingly shaped openings in the ring of said other of said first and second fittings.

2. A double containment pipe joint assembly in accordance with claim 1 wherein:
   said one of said first and second fittings having identical portions mounted in mirror-image relation to the other is constructed in two separate portions.

3. A double containment pipe joint assembly in accordance with claim 2 wherein:
   said first fitting includes a singular tubular body part and said second fitting includes said mirrorimage mounted parts.

4. A double containment pipe joint assembly of claim 3 wherein:
   said single tubular body part of said first fitting includes a ring mounted adjacent the mid portion thereof having a plurality of openings therethrough adapted to receive tabs on each of the mirror-image parts of said second fitting.

5. The pipe joint assembly of claim 4 wherein:
   said ring is formed integrally with said tubular body part of said first fitting and includes a smooth fillet at the juncture of said ring with said tubular body.

6. The pipe joint assembly of claim 5 wherein:
   said ring is attached to said tubular body part along a circumference having a greater diameter than the diameter of the rest of said tubular body portion of said first fitting.

7. The double containment pipe joint assembly of claim 6 including an annular collar secured to one end surface of said second fitting between said tubular body portion of said first fitting and an outer circular flange of said second fitting.

8. The double containment pipe joint assembly of claim 7 including an O-ring between said collar and said first tubular body portion and said collar and the flange on said second fitting.

9. The double containment pipe joint assembly of claim 8 wherein an opening is formed in each part of said second pipe fitting.

10. A double containment pipe joint assembly in accordance with claim 1 wherein:
said second fitting includes a singular tubular body part and said first fitting includes said mirror-image mounted parts.

11. A double containment pipe joint assembly of claim 10 wherein:
said single tubular body part of said second fitting includes a ring mounted adjacent the mid portion thereof within the interior thereof and having a plurality of openings therethrough adapted to receive tabs on each of the mirror-image parts of said first fitting.

12. The pipe joint assembly of claim 11 wherein:
said ring is formed integrally with said tubular body part of said second fitting and includes a smooth fillet at the juncture of said ring with said tubular body.

13. The pipe joint assembly of claim 12 wherein:
said ring is attached to said tubular body part along the inner circumference of said tubular body portion along a thickened circumferential wall portion thereof.

14. The double containment pipe joint assembly of claim 13 including an annular collar secured to one end surface of said first fitting between said tubular body portion of said first fitting and an inner circumference of said second fitting.

15. The double containment pipe joint assembly of claim 14 including an O-ring between said collar and said tubular body portion and said collar and the inner circumference of said second fitting.

16. The double containment pipe joint assembly of claim 15 wherein an opening is formed in each part of said second pipe fitting.

* * * * *